Nov. 29, 1932.   C. E. REED   1,889,217
EARTH BORING CHUCK
Filed June 26, 1929   2 Sheets-Sheet 1

INVENTOR.
Clarence E. Reed
BY
Ira L. Nickerson
ATTORNEY.

Nov. 29, 1932.  C. E. REED  1,889,217
EARTH BORING CHUCK
Filed June 26, 1929   2 Sheets-Sheet 2

INVENTOR.
Clarence E. Reed
BY
Ira L. Nickerson
ATTORNEY.

Patented Nov. 29, 1932

1,889,217

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

EARTH BORING CHUCK

Application filed June 26, 1929. Serial No. 373,715.

This invention relates to apparatus for making deep wells and in particular concerns a chuck for conveniently supporting implements and special tools used in carrying out the work.

One object of the invention is to adapt known types of bit heads to support a variety of tools. Another object is to provide a chuck of simple and rugged construction which can be assembled upon the tool and then securely fastened to the bit head with a minimum of effort. Other objects will be apparent from the detailed description which follows.

In drilling deep wells, it is customary, when the formation permits, to use a simple form of scraping tool such as a fish tail bit. When the relatively loose surface formation has been penetrated, rotary bits may be employed to continue the drilling. At various times during the drilling of a well it may be necessary to use other special implements such as fishing tools. The present invention provides a chuck which is directly applicable to the bit head used for the rotary drilling to support all these special tools and implements, thereby facilitating the work.

In order to illustrate the invention, a preferred embodiment thereof is shown in the accompanying drawings, in which.

Figure 1:
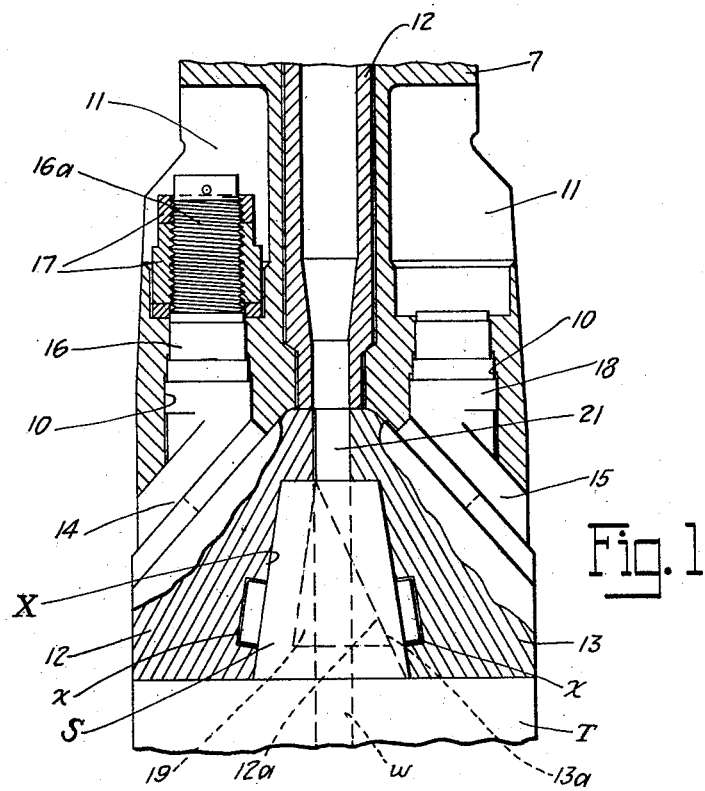
Fig. 1 is a sectional view of a bit head having a chuck mounted therein and supporting a tool, the chuck being partly in section and the tool in elevation.
Figure 2:
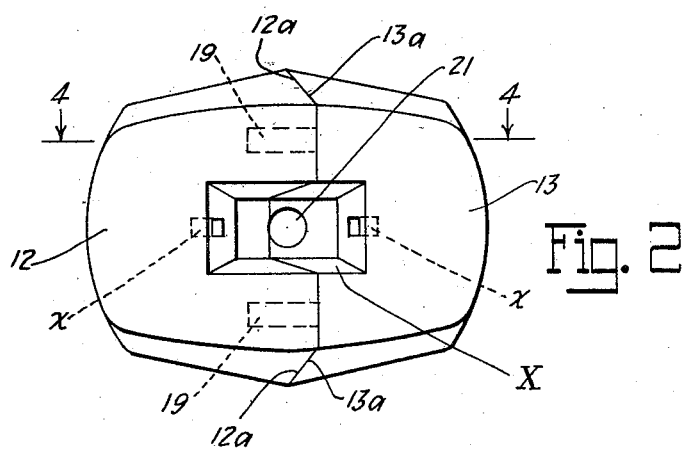
Fig. 2 is a bottom plan view of the assembled chuck.
Figure 3:
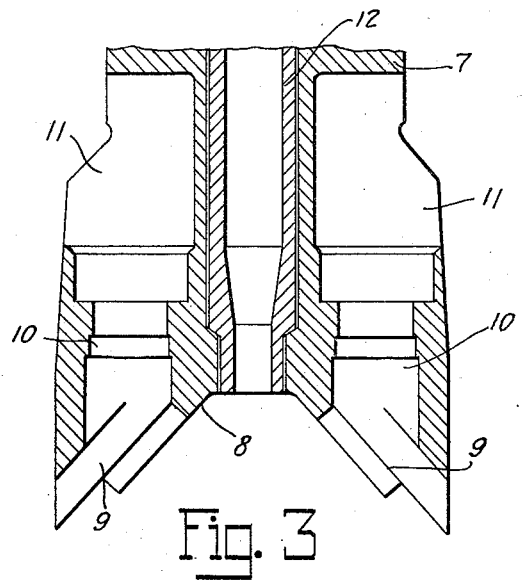
Fig. 3 is a vertical sectional view of the lower portion of the bit head or holder with the chuck removed.
Figure 5:
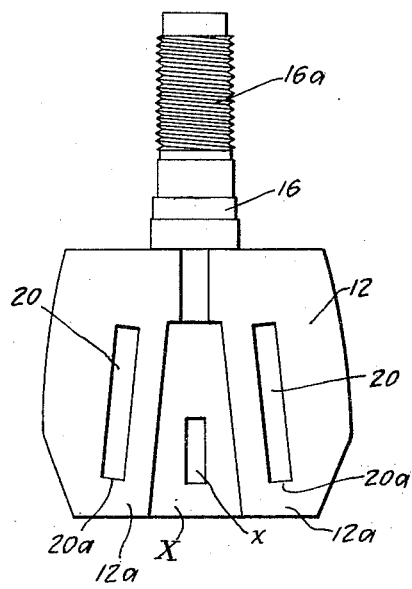
Figs. 5 and 6 are elevational views of the inner faces of the parts of the chuck.

The invention is illustrated in its application to a rotary bit head or holder of the general type shown in Letters Patent of the United States Nos. 1,636,665, 1,636,666, 1,636,667 and 1,636,668 granted to me on July 19, 1927. This bit head 7, the lower part of which is shown in section by itself in Fig. 3 and in connection with the chuck supported therein in Fig. 1, is of one piece and has at its lower end a recess 8 of a general inverted V-shape with stepped seat recesses 9 communicating therewith and sockets 10 extending therefrom in parallelism with the axis of the head. The head has laterally opening recesses 11 for the application of securing members to the ends of shanks inserted within sockets 10 and has an axially disposed water course 12 for flushing fluid. The sockets and seat recesses are adapted to receive parts of the cutter units when the bit head is used, as shown in the above patents, as a support or carrier for rotary cutter units.

The invention comprises a chuck composed of two or more parts adapted for lateral assembly and arranged for axial insertion into the inverted V-shaped recess 8. In the form of the invention shown the chuck comprises two parts 12 and 13 having stepped projections 14 and 15, respectively, to fit seat recesses 9. Part 12 has a shank 16 extending therefrom to fit one of the sockets 11 in the head 7, the shank terminating in a threaded end 16a upon which nuts 17 are applied securely to attach part 12 to the head. Part 13 may have a stub shank 18 to fit the other socket 10 in the head merely for the purpose of better keying part 13 to head 7 and of imparting the rotation of the latter to the tool supported in the chuck.

Figure 6:
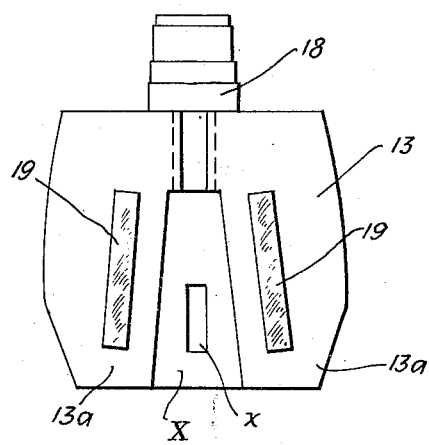

Suitable means are provided whereby part 12 securely retains part 13 in place and prevents its axial removal from recess 8. Such means may include engaging surfaces 12a and 13a at an angle to the vertical axis of the assembled head and chuck, the line of engagement of the surfaces being in substantial parallelism with the side of the recess 8 engaged by part 13 as clearly indicated in Fig. 1. In addition, suitable means provide an interlock between parts 12 and 13 through which the torque of rotation is distributed and by which axial separation of the parts of the chuck is still further prevented. Such interlocking means comprise projections 19 on member 13 engaging cooperating recesses 20 in member 12. By preference the general shape of projections 19 is triangular, as clearly indicated in Figs. 1, 4 and 6. Projections 19 are diametrically opposite one another and of sufficient extent to cross the center plane of the assembled chuck. They do not extend, however, through to the base of the chuck with the result that the lower faces 20a of recesses 20 in part 12 provide a positive stop to separating movement of the chuck parts in an axial direction.

The engaging faces of the chuck provide therebetween a recess X of any suitable form to receive the shank S of a working tool T, such as a fish tail bit or a fishing tool. In the form shown, the recess X is generally rectangular (Fig. 2) with inwardly tapering sides. Side recesses x may be provided to receive projections on shank S of tool T, as indicated in Figs. 1, 2, 5 and 6. The chuck parts may provide therebetween a passage 21 to form a connection between the water course 12 in the bit head and a central water course w in tool T.

Figure 4:
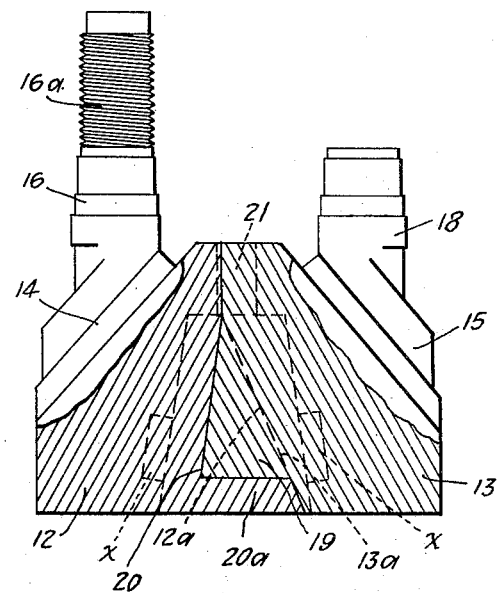
Fig. 4 is a view of the assembled chuck substantially in line with 4—4 of Fig. 2.

In use, parts 12 and 13 of the chuck are laterally moved into engagement with one another over the shank S of tool T and when so assembled, as indicated in Figs. 1 and 4, are moved axially into the lower end of bit head 7 (Fig. 3), shank 16 being directed into one of the sockets 10 in the bit head while stub shaft 18 is directed into the other. The securing members such as nuts 17, are then applied to the threaded end 16a of shank 16 and the chuck assembly is thereby tightly drawn into the inverted V-shaped recess 8 and securely held therein. Thus the attaching and the detaching of the chuck can be quickly accomplished with a minimum of effort. When in place, the chuck parts are positively held against separation by the interlocking feature of projections 19 and sockets 20 and the unsecured part 13 is constantly urged or maintained in engagement with the bit head by the slanting engaging surfaces 12a and 13a of the chuck parts.

While the invention has been herein disclosed in what is now considered to be a preferred form, it is to be understood that the invention is not limited to the specific details thereof but covers all changes, modifications, and adaptations within the scope of the appended claims.

I claim as my invention:

1. The combination with a bit head having a recess at its lower end with a plurality of off-center sockets opening into said recess, of a chuck comprising at least two parts and adapted when assembled for insertion into said recess, one of said parts having a shank to extend into one of said sockets, means providing an interlock between said parts, and means for securing said shank in said socket.

2. The combination with a bit head having a recess at its lower end with an off-center socket opening into said recess, of a chuck comprising at least two parts and adapted when assembled for insertion into said recess, one of said parts having a shank to fit said socket, and means for securing said shank in said socket, said shanked part providing means positively preventing axial withdrawal of the other chuck part from said recess.

3. The combination with a bit head having a recess at its lower end and a socket parallel with its vertical axis and opening into said recess, of a chuck for carrying a tool, said chuck having parts fitting said recess, one of said parts having an off-center shank to fit said socket, means for securing said shank in said socket, and means for holding the parts of the chuck assembly against axial separation.

4. The combination with a bit head having a recess at its lower end and sockets parallel with its vertical axis and opening into said recess, of a chuck for carrying a tool comprising a plurality of parts having interfitting portions adapting the same when assembled for axial insertion into said recess and providing an interlock against axial withdrawal of one part relative to the other part, said other part having a shank to fit one of said sockets, and means engaging said shank for securing the same in the socket thereby securely to maintain said chuck in assembled relation in said recess.

5. The combination with a bit head having a recess at its lower end and sockets parallel with its vertical axis and opening into said recess, of a two part chuck fitting said recess, one of said parts having a shank extending into one of said sockets for holding the chuck in place, said parts having engaging surfaces at such an angle to the axis of the head that said shanked part securely maintains the other part in said recess.

6. The combination with a bit head having a recess at its lower end and sockets parallel with its vertical axis and opening into said recess, of a two part chuck fitting said recess, one of said parts having a shank extending into one of said sockets, means engaging said shank for holding the chuck in place, and projections on one of said parts fitting recesses in the other part to prevent their axial separation.

7. The combination with a bit head having a recess at its lower end and sockets parallel with its vertical axis and opening into said recess, of a two part chuck fitting said recess, one of said parts having a shank extending into one of said sockets for holding the chuck in place, and interfitting means on said parts providing extended engaging surfaces angularly disposed to the axis of the bit head and stops positively to prevent axial separation of said parts.

8. The combination with a bit head having a recess at its lower end, seat recesses opening into said recess and sockets extending from said seat recesses in parallelism with the axis of the head, of a two part chuck fitting said recess, said chuck parts having projections fitting said seat recesses and having cooperating engaging surfaces at an angle to the axis of the head, one of said parts having a shank extending into one of the sockets in said head, and means cooperating with said shank to secure said chuck parts to said head.

9. The combination with a bit head having a recess at its lower end, seat recesses opening into said recess and sockets extending from said seat recesses in parallelism with the axis of the head, of a two part chuck fitting said recess, said chuck parts having projections fitting said seat recesses and shanks extending into said sockets, one only of said shanks having an extended end, securing means on said extended shank, and interlocking means on said chuck parts whereby said securing means on said extended shank securely holds both parts in said head recess against axial separation.

10. A chuck comprising parts arranged for lateral assembly, said parts having cooperating interfitting and engaging surfaces at an angle to the vertical or to the axis of the assembled chuck to form an interlock preventing axial movement of one part relative to the other in one direction.

11. A chuck comprising parts arranged for lateral assembly, and means on said parts preventing axial separation after assembly, one only of said parts having means for securing the assembled chuck to a bit head.

12. A chuck comprising parts arranged for lateral assembly and to fit a recess in a bit head when assembled, and means on said parts preventing axial separation after engagement with said head recess including cooperating engaging surfaces on said parts at an angle to the axis of the head, one of said parts having a shank and means on the same to secure the chuck to the bit head.

13. A chuck comprising parts arranged for lateral assembly, projections on one part fitting recesses in the other part to prevent their axial separation after assembly, and a shank on said recessed part only in parallelism with the axis of the assembled chuck having means for securing the same to a bit head.

14. A chuck comprising parts arranged for lateral assembly, interfitting means on said parts providing extended engaging surfaces angularly disposed to the axis of the chuck and positive stops against relative axial movement in one direction, and means on one of said parts for securing the assembled chuck to a bit head.

15. The combination with a bit head having a recess at its lower end with an off-center socket opening into said recess, of a chuck comprising at least two parts and adapted when assembled for insertion into said recess, one of said parts having a shank to fit said socket, means for securing said shank in said socket and means for holding the parts of the chuck in assembly against axial separation.

Signed by me at Wichita, county of Sedgwick and State of Kansas, this 21st day of June, 1929.

CLARENCE E. REED.